(12) United States Patent
Takami et al.

(10) Patent No.: US 11,870,072 B2
(45) Date of Patent: Jan. 9, 2024

(54) SECONDARY BATTERY, BATTERY PACK, VEHICLE, AND STATIONARY POWER SUPPLY

(71) Applicant: KABUSHIKI KAISHA TOSHIBA, Tokyo (JP)

(72) Inventors: Norio Takami, Yokohama Kanagawa (JP); Tomoko Sugizaki, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 165 days.

(21) Appl. No.: 17/186,062

(22) Filed: Feb. 26, 2021

(65) Prior Publication Data
US 2022/0085369 A1    Mar. 17, 2022

(30) Foreign Application Priority Data
Sep. 15, 2020   (JP) ................................ 2020-154458

(51) Int. Cl.
*H01M 4/58*     (2010.01)
*H01M 10/0562*   (2010.01)
(Continued)

(52) U.S. Cl.
CPC .......... *H01M 4/582* (2013.01); *H01M 4/136* (2013.01); *H01M 4/382* (2013.01);
(Continued)

(58) Field of Classification Search
CPC ...... H01M 4/582; H01M 4/136; H01M 4/382; H01M 10/0562; H01M 10/425;
(Continued)

(56) References Cited

U.S. PATENT DOCUMENTS 5,552,241 A * 9/1996 Mamantov ............ H01G 9/022
429/103
2012/0183836 A1   7/2012 Harada
(Continued)

FOREIGN PATENT DOCUMENTS

JP   WO-2011/013254 A1   1/2013
JP   2017-059366 A   3/2017
(Continued)

OTHER PUBLICATIONS

Morita, et al., "High Specific Energy Density Aqueous Lithium-Metal Chloride Rechargeable Batteries" Journal of The Electrochemical Society, 164(9) A 1958-A 1964 2017, 8 pages.

*Primary Examiner* — Stewart A Fraser
(74) *Attorney, Agent, or Firm* — Foley & Lardner LLP (57) ABSTRACT

According to one embodiment, a secondary battery includes a positive electrode, a negative electrode, a nonaqueous electrolyte and a separator. The positive electrode includes a halide including at least one metal element selected from the group consisting of copper, iron, nickel, cobalt, tin, and zinc. The negative electrode includes at least one selected from the group consisting of lithium metal, a lithium alloy, and a compound capable of having Li inserted and extracted. The nonaqueous electrolyte includes an ionic liquid including chlorine ions. The separator has lithium ion conductivity, and is interposed between the positive electrode and the negative electrode.

10 Claims, 4 Drawing Sheets

(51) Int. Cl.
   *H01M 4/136*    (2010.01)
   *H01M 50/46*    (2021.01)
   *H01M 4/38*     (2006.01)
   *H01M 10/42*    (2006.01)
   *H01M 4/02*     (2006.01)

(52) U.S. Cl.
   CPC ..... *H01M 10/0562* (2013.01); *H01M 10/425* (2013.01); *H01M 50/46* (2021.01); *H01M 2004/027* (2013.01); *H01M 2004/028* (2013.01); *H01M 2220/20* (2013.01)

(58) Field of Classification Search
   CPC ........... H01M 50/46; H01M 2004/027; H01M 2004/028; H01M 2220/20; H01M 10/052; H01M 50/572
   See application file for complete search history.

(56) References Cited

U.S. PATENT DOCUMENTS

| | | | | |
|---|---|---|---|---|
| 2015/0325883 | A1* | 11/2015 | Matsui | H01G 11/64 |
| | | | | 429/339 |
| 2016/0079609 | A1* | 3/2016 | Choi | H01M 4/06 |
| | | | | 429/50 |
| 2017/0077494 | A1* | 3/2017 | Iwasaki | H01M 50/20 |
| 2019/0379045 | A1* | 12/2019 | He | H01M 4/38 |
| 2020/0052325 | A1* | 2/2020 | Zhamu | H01M 4/13 |
| 2020/0194823 | A1* | 6/2020 | Takami | H01M 10/425 |
| 2021/0296684 | A1* | 9/2021 | Takami | H01M 4/582 |

FOREIGN PATENT DOCUMENTS

| | | |
|---|---|---|
| JP | 2020-047419 A | 3/2020 |
| WO | WO-2015/001803 A1 | 1/2015 |

\* cited by examiner

SECONDARY BATTERY, BATTERY PACK, VEHICLE, AND STATIONARY POWER SUPPLY

CROSS-REFERENCE TO RELATED APPLICATIONS

This application is based upon and claims the benefit of priority from Japanese Patent Application No. 2020-154458, filed Sep. 15, 2020, the entire contents of which are incorporated herein by reference.

FIELD

Embodiments described herein generally relate to a secondary battery, a battery pack, a vehicle, and a stationary power supply.

BACKGROUND

Nonaqueous electrolyte batteries using lithium metal, lithium alloys, lithium compounds, or carbonaceous materials for a negative electrode have been envisaged as a battery having a high energy density and have been actively researched and developed. So far, a lithium ion battery that has a positive electrode including $LiCoO_2$ or $LiMn_2O_4$ as an active material, and a negative electrode including a carbonaceous material having lithium ions inserted and extracted has been widely commercialized for portable devices. To promote its applicability to electric automobiles and/or stationary storage batteries, not only enhancing the energy density and capacity of a secondary battery but also improving its durability life performance, low-temperature performance, and safety have been demanded. To enhance the energy density of a secondary battery, a battery including a metal negative electrode (e.g., Li, Na, Mg, Al), a battery having a positive electrode including sulfur, or a battery using an air electrode for the positive electrode have been researched and developed as a post-lithium ion battery; however, it has been difficult to cope with both a high energy density and the durability life performance.

In the battery including a metal negative electrode, using Li metal for the metal negative electrode presents a problem such as a short circuit due to dendrite deposition, and using Mg metal for the metal negative electrode increases an overvoltage and presents a problem of a low cycle life performance. On the other hand, in recent years, metal halides such as $CuCl_2$, $NiCl_2$, $CoCl_2$, and $FeCl_2$ have been studied as a next-generation positive electrode active material with a high capacity; however, the metal halides employ an aqueous solution or an organic solvent as an electrolyte solution, which presents the problem of a bad charge/discharge efficiency and a large overvoltage as well, and thus have not been commercialized. In particular, with an electrolyte solution made of an aqueous solution, hydrogen is easily generated from a positive electrode during discharge, which lowers the charge/discharge efficiency and shortens the cycle life. In addition, sulfur has been studied for use as a high-capacity and low-cost positive electrode material; however, sulfur, which has no electro-conductivity and thus is low in charge and discharge rate performance, and is dissolved in the electrolyte solution and thus presents a problem of a lower cycle life performance, has not been put into actual use.

DETAILED DESCRIPTION

According to one embodiment, a secondary battery includes a positive electrode, a negative electrode, a nonaqueous electrolyte and a separator. The positive electrode includes a halide including at least one metal element selected from the group consisting of copper, iron, nickel, cobalt, tin, and zinc, as a positive electrode active material. The negative electrode includes at least one selected from the group consisting of lithium metal, a lithium alloy, and a compound capable of having Li inserted and extracted, as a negative electrode active material. The nonaqueous electrolyte includes an ionic liquid including chlorine ions. The separator has lithium ion conductivity. And the separator is interposed between the positive electrode and the negative electrode.

According to another embodiment, a battery pack includes the secondary battery according to the embodiment.

According to another embodiment, a vehicle includes the secondary battery according to the embodiment.

According to another embodiment, a stationary power supply includes the secondary battery according to the embodiment.

First Embodiment

A secondary battery according to a first embodiment includes a positive electrode, a negative electrode, a first nonaqueous electrolyte, and a separator having lithium ion conductivity. The positive electrode includes, as a positive electrode active material, a halide including one or more metal elements selected from the group consisting of copper, iron, nickel, cobalt, tin, and zinc. The negative electrode includes, as a negative electrode active material, one or more selected from the group consisting of lithium metal, a lithium alloy, and a compound capable of having Li inserted and extracted. The nonaqueous electrolyte is in contact with the positive electrode, or is held or impregnated in the positive electrode. The nonaqueous electrolyte includes an ionic liquid including chlorine ions. The ionic liquid includes desirably positive ions (cations) and negative ions (anions), and includes chlorine ions as the negative ions in this case. The separator having lithium ion conductivity is interposed between the positive electrode and the negative electrode.

When the separator having lithium ion conductivity includes a substance which is selectively permeable to lithium ions, for example, a lithium-ion conductive solid electrolyte, the secondary battery displays the following fundamental battery reaction. In the discharge reaction, lithium ions ($Li^+$) extracted from the negative electrode pass through the lithium-ion conductive separator to move to the positive electrode. Meanwhile, a halide ($MX_n$) including at least one metal element M selected from the group consisting of copper, iron, nickel, cobalt, tin, and zinc, included in the positive electrode active material, is reduced through the reaction with lithium, resulting in the metal element M and nLiX being deposited. This reaction is represented by the following equation (1). The reaction of the equation (1), that is, the dissolution-deposition reaction due to the oxidization-reduction reaction of the halide including the metal element M can readily proceed in the ionic liquid including chlorine ions, for example, ionic liquid including LiCl and being in the form of a liquid or gel. As a result, the efficiency of the charge-discharge reactions is increased, which can reduce the overvoltage.

[Chemical Formula 1]

$$MX_n + nLi^+ + ne^- = M + nLiX \qquad (1)$$

The lithium-ion conductive solid electrolyte is selectively permeable to lithium ions. Thus, cations of the metal element M cannot permeate the lithium-ion conductive solid electrolyte and remain on the positive electrode side. The presence of the ionic liquid including chlorine ions causes LiCl to be supersaturated and deposited in the discharge reaction. LiCl is dissolved to release the chlorine ions in the charge reaction. Accordingly, this promotes the production reaction for the halide of the metal element M to proceed the charge reaction, which increases the efficiency of the charge-discharge reactions and can reduce the overvoltage. This provides less self-discharge, which provides excellent storage performance. Accordingly, the oxidation-reduction reactions according to the dissolution and deposition of the metal element M can be efficiently and smoothly performed in the halide of the metal element M which is the positive electrode active material, whereby a secondary battery having a high energy density and excellent durability in life performance can be provided.

(1) Positive Electrode

The positive electrode includes: a positive electrode active material-containing layer including a positive electrode active material; and a positive electrode current collector which is in contact with the positive electrode active material-containing layer.

The positive electrode active material includes a halide including one or more metals selected from the group consisting of copper, iron, nickel, cobalt, tin, and zinc in the start from discharge. For the halogen ion, a fluorine ion ($F^-$) or a chlorine ion ($Cl^-$) is preferable. This is because a high voltage can be obtained and because the charge reaction smoothly proceeds. The fluorine ion or the chlorine ion provides a more excellent battery weight energy density than that of a bromine ion or an iodine ion. Examples of a preferable metal halide include $CuF_x$ ($0<x\leq2$), $CuCl_x$ ($0<x\leq2$), $FeF_x$ ($0<x\leq3$), $FeCl_x$ ($0<x\leq3$), $NiCl_x$ ($0<x\leq2$), $CoF_x$ ($0<x\leq3$), $CoCl_x$ ($0<x\leq3$), $SnCl_x$ ($0<x\leq2$), and $ZnCl_2$. A more preferable metal halide is $CuCl_2$, $CuF_2$, or $FeF_3$, which provides a high voltage and a high capacity. The kind of the halide to be used can be set to one kind or two kinds or more. Meanwhile, in the start from charge, a mixture of one or more metals selected from the group consisting of copper, iron, nickel, cobalt, tin, and zinc, and lithium halide can be used as the positive electrode active material. The average particle size (diameter) of the halide is preferably 0.01 to 100 μm, and more preferably 0.1 to 10 μm.

The positive electrode active material-containing layer may include a conductive agent. Examples of the conductive agent include carbon materials such as carbon nanofibers, acetylene black, and graphite. The above kinds of carbon material can improve the network of electrons in the positive electrode. The kind of the conductive agent can be set to one kind or two kinds or more. The proportion of the conductive agent in the positive electrode active material-containing layer (excluding the weight of nonaqueous electrolyte) is preferably 5 to 40% by weight.

The positive electrode active material-containing layer may include a binder. Examples of the binder include polyethylene terephthalate, polysulfone, polyimide, cellulose, and rubber. The above kinds of the binder have excellent chemical stability with regard to a nonaqueous electrolyte including chlorine ions. The kind of the binder can be set to one kind or two kinds or more. The proportion of the binder in the positive electrode active material-containing layer (excluding the weight of nonaqueous electrolyte) is preferably 1 to 10% by weight.

Examples of the positive electrode current collector which can be used include a porous material, mesh or foil made of one or more metals selected from the group consisting of copper, stainless steel, iron, nickel, cobalt, tin, and zinc. Preferable examples of the metal element include copper, stainless steel, nickel, iron, and an alloy including one or more of these. As a result, the surface of the positive electrode current collector dissolves during over-charge, which increases the resistance of the positive electrode, whereby the over-charge reaction can be suppressed and the safety can be improved. The thickness of the positive electrode current collector is preferably 10 to 20 μm. The porosity of the porous material is preferably 30 to 98%. More preferably, the porosity is 50 to 60%. In particular, the positive electrode including at least one of $CuCl_2$ and $CuF_2$ has a high voltage, whereby the use of Cu as the current collector makes it possible to use at least a part of the Cu current collector as the active material. As a result, the discharge voltage curve of the positive electrode can show one flat voltage portion appeared in a range of 2.8 to 2.5 V.

The thickness of the positive electrode varies depending on electrode shapes and applications. When the electrode group takes a stacked structure or a wound structure, the thickness of the positive electrode is preferably 30 to 200 μm in a high-output application, and 200 to 1000 μm in a high-energy application.

(2) Nonaqueous Electrolyte Including Ionic Liquid Including Chlorine Ions (First Nonaqueous Electrolyte)

It is desirable that the nonaqueous electrolyte including the ionic liquid including chlorine ions is in contact with the positive electrode or is included or held in the positive electrode. This makes the charge-discharge reactions of the positive electrode smoothly generated in the presence of the chlorine ions.

The nonaqueous electrolyte including the ionic liquid including chlorine ions is in contact with at least the positive electrode, but it may be in contact with the negative electrode. A common nonaqueous electrolyte may be used for the positive electrode and the negative electrode.

The ionic liquid including chlorine ions may be a non-chloroaluminate-based ionic liquid. A chloroaluminate-based ionic liquid such as an ionic liquid including $AlCl_3$ includes aluminum ions which are not involved in the charge-discharge reactions, and is less likely to dissolve a lithium salt. Therefore, the chloroaluminate-based ionic liquid has high electrical resistance. Meanwhile, since the non-chloroaluminate-based ionic liquid does not include an aluminum component, and is likely to dissolve a lithium salt, the non-chloroaluminate-based ionic liquid has lower resistance than that of the chloroaluminate-based ionic liquid.

Examples of salts or compounds which supply chlorine ions include LiCl. Since the lithium salt is likely to dissociate in the ionic liquid including LiCl, and the solubility of the lithium salt in the ionic liquid including LiCl is excellent, the concentration of lithium ions in the ionic liquid including LiCl can be increased. LiCl is involved in the charge-discharge reactions. The content of a chloride in the nonaqueous electrolyte can be in the range of 0.01 mol/kg or more and 0.2 mol/kg or less, and may exceed a saturated dissolution amount.

When the positive electrode active material-containing layer of the positive electrode has a porous structure, the positive electrode active material-containing layer can hold or include the ionic liquid including chlorine ions. The proportion of the nonaqueous electrolyte in the positive electrode active material-containing layer is preferably in the range of 10 to GO % by weight. The proportion being 10% by weight or more can increase the effective area for the electrochemical reaction, which can improve the battery capacity and achieve resistance suppression. The proportion being 60% by weight or less increases the positive electrode weight proportion, which can improve the battery capacity.

The ionic liquid including chlorine ions can be, for example, in the form of a liquid or gel. The gel nonaqueous electrolyte including the ionic liquid can be obtained, for example, by adding a polymer and a gelling agent to an ionic liquid to gel the ionic liquid. The polymer can increase the mechanical strength of the gel nonaqueous electrolyte. Examples of the polymer include polyvinylidene fluoride (PVdF) and an acrylic binder. The kind of the polymer can be set to one kind or two kinds or more. The gelling agent is not particularly limited as long as it can gel a nonaqueous electrolyte, and either a chemical gelling agent or a physical gelling agent can be used. Examples thereof include polyacrylonitrile (PAN), polyethylene oxide (PEO), polyvinylidene fluoride (PVdF), and polymethyl methacrylate. The kind of the gelling agent can be set to one kind or two kinds or more.

The ionic liquid may be composed of positive ions (cations) and negative ions (anions). Examples of the ionic liquid include a sulfonium salt, an imidazolium salt, a quaternary ammonium salt, and a lithium salt. The kind of the ionic liquid can be set to one kind or two kinds or more. Lithium ions can be supplied, for example, from the lithium salt. Examples of the lithium salt include $LiBF_4$, $LiPF_6$, $LiAsF_6$, $LiClO_4$, $LiCF_3SO_3$, $LiN(FSO_2)_2$, $Li[N(FSO_2)(CF_3SO_2)]$, $LiN(CF_3SO_2)_2$, $LiN(C_2F_5SO_2)_2$, $Li(CF_3SO_2)_3C$, and $LiB[(OCO)_2]_2$. The kind of the lithium salt to be used can be set to one kind or two kinds or more. The amount of the lithium salt dissolved in the ionic liquid is preferably 0.01 mol/kg or more and 2 mol/kg or less. A more preferable lithium salt is at least one of $LiN(FSO_2)_2$, $Li[N(FSO_2)(CF_3SO_2)]$, or $LiN(CF_3SO_2)_2$. Since these lithium salts have a large degree of dissociation in the ionic liquid, the amount thereof dissolved in the ionic liquid is large, which makes it possible to increase the concentration of lithium ions in the nonaqueous electrolyte and reduce the viscosity. $LiN(FSO_2)_2$, $Li[N(FSO_2)(CF_3SO_2)]$, and $LiN(CF_3SO_2)_2$ are abbreviated as LiFSI, LiFTFSI, and LiTFSI, respectively.

In the sulfonium salt, a trialkylsulfonium ion has an anion paired with one having a skeleton represented by the following equation (1). Examples of the trialkylsulfonium ion include a triethylsulfonium ion, a trimethylsulfonium ion, and a methylethylpropylsulfonium ion. An ionic liquid including at least one of a triethyl sulfonium ion ($S(C_2H_5)_3^+$) or a methyl ethyl propyl sulfonium ion has a low melting point and high ionic conductivity. Meanwhile, examples of the anion include halogen ions such as $Cl^-$, $Br^-$, and $I^-$, $BF_4^-$, $PF_5^-$, $AsF_6^-$, $ClO_4^-$, $CF_3SO_3^-$, $CF_3COO^-$, $CH_3CO^-$, $CO_3^{2-}$, $[N(FSO_2)_2]^-$, $[N(FSO_2)(CF_3SO_2)]^-$, $[N(CF_3SO_2)_2]^-$, $[N(C_2F_5SO_2)_2]^-$, and $(CF_3SO_2)_3C^-$. The kind of each ion can be set to one kind or two kinds or more. Particularly preferred are $[N(FSO_2)_2]^-$, $[N(FSO_2)(CF_3SO_2)]^-$, $[N(CF_3SO_2)_2]^-$, $BF_4^-$, and $PF_6^-$.

[Chemical Formula 2]

Equation (1)

Examples of the imidazolium salt include a salt made of an alkylimidazolium ion and an anion to be paired therewith. As the alkylimidazolium ion, a dialkylimidazolium ion, a trialkylimidazolium ion, a tetraalkylimidazolium ion, or the like is preferable. Examples of the dialkylimidazolium include 1-methyl-3-ethylimidazolium ion ($MEI^+$). Examples of the trialkylimidazolium ion include 1,2-diethyl-3-propylimidazolium ion ($DMPI^+$). Examples of the tetraalkylimidazolium ion include 1,2-diethyl-3,4 (5)-dimethylimidazolium ion. Meanwhile, examples of the anion include halogen ions such as $Cl^-$, $Br^-$, and $I^-$, $BF_4^-$, $PF_6^-$, $AsF_6^-$, $ClO_4^-$, $CF_3SO_3^-$, $CF_3COO^-$, $CH_3CO^-$, $CO_3^{2-}$, $[N(CF_3SO_2)_2]^-$, $[N(FSO_2)_2]^-$, $[N(FSO_2)(CF_3SO_2)]^-$, $[N(C_2F_5SO_2)_2]^-$, and $(CF_3SO_2)_3C^-$. The kind of each ion can be set to one kind or two kinds or more.

The quaternary ammonium salt may be a salt made of a quaternary ammonium ion and an anion to be paired therewith. Examples of the quaternary ammonium ion include a tetraalkylammonium ion and a cyclic ammonium ion. Examples of the tetraalkylammonium ion include dimethylethylmethoxyethylammonium ion, dimethylethylmethoxymethylammonium ion, dimethylethylethoxyethylammonium ion, and trimethylpropylammonium ion ($TMPA^+$). Meanwhile, examples of the anion include halogen ions such as $Cl^-$, $Br^-$, and $I^-$, $BF_4^-$, $PF_6^-$, $AsF_6^-$, $ClO_4^-$, $CF_3SO_3^-$, $CF_3COO^-$, $CH_3CO^-$, $CO_3^{2-}$, $[N(CF_3SO_2)_2]^-$, $[N(FSO_2)_2]^-$, $[N(FSO_2)(CF_3SO_2)]^-$, $[N(C_2F_5SO_2)_2]^-$, and $(CF_3SO_2)_3C^-$. The kind of each ion can be set to one kind or two kinds or more.

By using the trialkylsulfonium ion, the alkylimidazolium ion, or the quaternary ammonium ion (in particular, the tetraalkylammonium ion), the melting point of the ionic liquid can be lowered. A trialkylsulfonium ion having a lower reduction decomposition potential is preferable because it is also stable with respect to a metal Li negative electrode.

Furthermore, since the ionic liquid including chlorine ions has high electrochemical stability, its reactivity with the positive electrode in the charge-discharge reactions at the positive electrode can be lowered. Accordingly, this can increase the efficiency of the charge-discharge reactions due to the dissolution-deposition reactions of the positive electrode active material, and thus improve the cycle life performance. Furthermore, this provides suppressed self-discharge, which provides excellent storage performance.

The ionic liquid including chlorine ions can suppress an over-charge reaction and an over-discharge reaction. As the discharge reaction proceeds, the metal deposition due to the reduction reaction of the metal element of the metal-element-M-containing halide occurs, and also the concentration of the lithium halide (for example, LiCl or LiF) increases. When the concentration of the lithium halide reaches supersaturation, the lithium halide is deposited. As a result, in the over-discharge state, the ionic conductivity of the ionic liquid decreases in the positive electrode, which causes solidification. The over-discharge reaction ceases accordingly, which suppresses deterioration of the positive electrode due to the over-discharge. Meanwhile, as the charge reaction proceeds, the deposited metal element is oxidized and eluted, and then deposited as the metal halide. In the over-charge reaction, since lithium ions in the positive electrode are depleted, ionic conduction in the lithium-ion conductive separator ceases. As a result, the over-charge reaction ceases, which suppresses deterioration of the positive electrode due to the over-charge reaction. Through such a reaction mechanism, the secondary battery has greatly improved safety and durability against the over-charge reaction and the over-discharge reaction, which can eliminate the need for a circuit for preventing over-charge and over-discharge.

The ionic liquid including chlorine ions preferably includes chlorine ions, at least one cation selected from the group consisting of trialkylsulfonium cation, alkylimidazolium cation, quaternary ammonium cation, and lithium ion, at least one anion selected from the group consisting of $[N(CF_3SO_2)_2]^-$, $[N(FSO_2)_2]^-$, $[N(FSO_2)(CF_3SO_2)]^-$, $PF_6^-$, and $BF_4^-$. The ionic liquid having this composition has a low melting point and excellent lithium salt solubility, and excellent charge-discharge performance can be obtained.

(3) Negative Electrode

The negative electrode includes, as a negative electrode active material, at least one selected from the group consisting of lithium metal, a lithium alloy, and a compound capable of having Li inserted and extracted. The kind of the negative electrode active material to be used can be set to one kind or two kinds or more. The negative electrode including lithium metal can increase capacity of a secondary battery with a voltage of 3V or more and less than 4V to increase the energy density of the secondary battery.

The compound capable of having Li inserted and extracted is a compound capable of having lithium or lithium ions inserted and extracted, Examples of the compound include lithium graphite and a lithium carbon material having lithium ions inserted in advance.

Examples of the lithium alloy include alloys such as Li—Al, Li—Si, and Li—Zn.

The lithium metal and the lithium alloy are preferably in the form of a foil.

The negative electrode may include a negative electrode active material-containing layer. The negative electrode active material-containing layer may include a conductive agent and/or a binder.

As the conductive agent, for example, a carbon material, a metal compound powder, a metal powder, or the like can be used. Examples of the carbon material include acetylene black, carbon black, coke, carbon fibers, graphite, and carbon nanotubes. The carbon material preferably has a BET specific surface area of 10 $m^2/g$ or more based on $N_2$ adsorption. Examples of the metal compound powder include TiO, TiC, and TiN powders. Examples of the metal powder include Al, Ni, Cu, and Fe powders. Preferable examples of the conductive agent include coke having an average particle diameter of 10 μm or less with a heat treatment temperature of 800° C. to 2000° C., graphite, acetylene black, carbon fibers having an average fiber diameter of 1 μm or less, and TiO powder. One or more selected from these can achieve a reduction in the electrode resistance and an improvement in the cycle life performance. The kind of the conductive agent can be set to one kind or two kinds or more.

Examples of the binder include polytetrafluoroethylene (PTFE), polyvinylidene fluoride (PVdF), fluorine-based rubber, acrylic rubber, styrene-butadiene rubber, a core-shell binder, polyimide, and carboxymethyl cellulose (CMC). The kind of the binder can be set to one kind or two kinds or more.

The negative electrode active material-containing layer including a compound capable of having Li inserted and extracted (hereinafter, referred to as a first compound) is produced by, for example, suspending the first compound, the conductive agent, and the binder in an appropriate solvent, applying the suspension to a current collector, and performing drying and pressing. The compounding ratios of the first compound, the conductive agent, and the binder are preferably in the range of 80 to 95% by weight of the first compound, 3 to 18% by weight of the conductive agent, and 2 to 7% by weight of the binder. A lithium metal foil or a lithium alloy foil may be used as the negative electrode active material-containing layer.

The negative electrode may further include a negative electrode current collector. Examples of the negative electrode current collector include a foil or mesh including a metal, such as copper or nickel. The negative electrode current collector may be in contact with the negative electrode active material-containing layer. It is desirable that the negative electrode current collector is electrically connected to a negative electrode terminal via a lead.

The capacity of the negative electrode is preferably equal to or larger than that of the positive electrode.

The thickness of the negative electrode varies depending on electrode shapes and applications. When the electrode group takes a stacked structure or a wound structure, the thickness of the negative electrode is preferably 30 to 100 μm in a high-output application, and 100 to 500 μm in a high-energy application.

(4) Separator Having Lithium Ion Conductivity

The separator having lithium ion conductivity is a film or layer which is selectively permeable to lithium ions, namely, which is impermeable to cations other than lithium. In order to prevent the metal ions of the positive electrode active material dissolved in the nonaqueous electrolyte (ionic liquid including chlorine ions) in contact with the positive electrode surface from moving to the negative electrode, the separator having lithium ion conductivity desirably has a non-communicating structure without any through-hole or is free from holes. This provides significantly suppressed self-discharge, which provides excellent storage performance. It is desirable that the separator having lithium ion conductivity does not allow ions other than lithium ions to permeate, in other words, allows only lithium ions to permeate.

Examples of the lithium-ion conductive separator include those including an oxide having lithium ion conductivity, a sulfide having lithium ion conductivity, a phosphate having lithium ion conductivity, a polymer having lithium ion conductivity, a solid electrolyte having lithium ion conductivity, and a composite obtained by combining two or more of each component. The lithium-ion conductive separator may be a composite further including an inorganic substance and/or an organic substance in addition to the above components.

The lithium-ion conductive separator may be layered or a film.

As the lithium-ion conductive separator, a separator including a lithium ion conductive inorganic solid electrolyte and a polymer may be used. In the separator, a composite of a lithium ion conductive inorganic solid electrolyte and a polymer is desirable. The separator has excellent flexibility. The separator is selectively permeable to lithium ions, and is free from holes or has the non-communicating structure. Therefore, this separator is permeable to only the lithium ions. The separator may further include a lithium salt. Examples of the lithium salt are as described in (2). The content of the lithium salt in the separator may be in the range of 50% by weight or less (including 0). Examples of the polymer include polyethyleneoxide (PEO), polyethylene terephthalate, and polyvinylidene fluoride (PVdF). By using the separator including the lithium-ion conductive inorganic solid electrolyte, the polymer, and optionally the lithium salt, only lithium ions can selectively move in the separator, and chlorine ions, anion species, and cation species in the positive electrode and ions other than lithium ions in the negative electrode are prevented from moving through the separator.

Examples of the lithium-ion conductive solid electrolyte include an oxide solid electrolyte having a garnet-type structure and a lithium phosphate solid electrolyte having a NASICON type structure. The oxide solid electrolyte having a garnet-type structure advantageously has high reduction resistance and a wide electrochemical window. Examples of the oxide solid electrolyte having a garnet-type structure include $Li_{5+x}A_xLa_{3-x}M_2O_{12}$). (A is at least one selected from the group consisting of Ca, Sr, and Ba, M is at least one selected from the group consisting of Nb and Ta, $0 \leq x \leq 0.5$), $Li_3M_{2-x}L_xO_{12}$ (M is at least one selected from the group consisting of Ta and Nb, L may include Zr, $0 \leq x \leq 0.5$), $Li_{7-3x}Al_xLa_3Zr_3O_{12}$ ($0 \leq x \leq 0.5$), and $Li_7La_3Zr_2O_{12}$. Among them, $Li_{6.25}Al_{0.25}La_3Zr_3O_{12}$ and $Li_7La_3Zr_2O_{12}$ have high ionic conductivity and is electrochemically stable, and thus has excellent discharge performance and cycle life performance.

Examples of the NASICON-type lithium phosphate solid electrolyte include those represented by $LiM_2(PO_4)_3$ (M is one or more selected from Ti, Ge, Sr, Zr, Sn, Al, or Ca). In particular, $Li_{1+x}Al_xGe_{2-x}(PO_4)_3$ ($0 \leq x \leq 0.5$), $Li_{1-x}Al_xZr_{2-x}(PO_4)_3$ ($0 \leq x \leq 0.5$), and $Li_{1+x}Al_xTi_{2-x}(PO_4)_3$ ($0 \leq x \leq 0.5$) are preferable because they have high ionic conductivity and high electrochemical stability.

The content of the lithium-ion conductive inorganic solid electrolyte in the separator may be in the range of 10° by weight or more and 90% by weight or less.

The thickness of the separator is preferably 20 to 200 μm. If the thickness falls below this range, the mechanical strength may decrease. If the thickness exceeds this range, the ion conduction resistance may increase.

(5) First Porous Layer

The secondary battery may include a first porous layer. The first porous layer may be interposed between the separator having lithium ion conductivity and the positive electrode. The first porous layer holds or is impregnated with the nonaqueous electrolyte including the ionic liquid including chlorine ions, which allows the ionic liquid including chlorine ions to be present on or in the vicinity of the surface of the positive electrode. This can reduce the interface resistance between the positive electrode and the separator.

Examples of the first porous layer include a porous film made of polypropylene (PP), polyethylene (PE), polyimide, or the like, a nonwoven fabric made of a polymer such as cellulose, and a porous layer including particles made of an inorganic oxide such as alumina. A composite configured of stacked multiple types of layers may be used as the first porous layer.

The thickness of the first porous layer may be in the range of 5 to 50 μm. More preferably, the thickness of the first porous layer is in the range of 5 to 20 μm.

The first porous layer may have a porosity in the range of 40 to 80%.

(6) Second Porous Layer

The secondary battery may include a second porous layer. The second porous layer may be interposed between the separator having lithium ion conductivity and the negative electrode. The second porous layer holds or is impregnated with the nonaqueous electrolyte including the ionic liquid including lithium ions, which allows the ionic liquid including lithium ions to be present on or in the vicinity of the surface of the negative electrode. This can reduce the interface resistance between the negative electrode and the separator. As a result, the negative electrode charge-discharge reactions can uniformly proceed; a high coulomb efficiency is obtained; and the cycle life performance of the secondary battery is improved. In a secondary battery including the negative electrode including lithium metal or a lithium alloy, uniform proceeding of the negative electrode charge-discharge reactions can prevent deposition of Li dendrites. When the negative electrode is made to include a compound capable of having Li inserted and extracted, the negative electrode active material-containing layer may have a porous structure, so that the second porous layer may not be provided.

Examples of the second porous layer include a porous film made of polypropylene (PP), polyethylene (PE), polyimide, or the like, a nonwoven fabric made of a polymer such as cellulose, and a porous layer including particles made of an inorganic oxide such as alumina. A composite configured of stacked multiple types of layers may be used as the second porous layer.

The thickness of the second porous layer may be in the range of 5 to 50 μm. More preferably, the thickness of the second porous layer is in the range of 5 to 20 μm.

The second porous layer may have a porosity in the range of 40 to 80%.

(7) Nonaqueous Electrolyte Including Lithium Ions (Second Nonaqueous Electrolyte)

It is desirable that the second nonaqueous electrolyte including lithium ions is in contact with the negative electrode or is included or held in the negative electrode. This reduces the interface resistance of the negative electrode and allows the negative electrode charge-discharge reactions to uniformly proceed, which achieves a high coulomb efficiency and improves the cycle life performance. Examples of the nonaqueous electrolyte including lithium ions include a nonaqueous electrolyte including an ionic liquid including lithium ions.

As the ionic liquid including lithium ions, the above-described ionic liquid including LiCl may be used, or an ionic liquid different from the ionic liquid including LiCl may be used.

The ionic liquid maybe, for example, in the form of a liquid or gel. The gel nonaqueous electrolyte including the ionic liquid can be obtained, for example, by adding a polymer and a gelling agent to an ionic liquid to gel the ionic liquid. Examples of the polymer and the gelling agent are as described in the above (2).

The ionic liquid may be composed of positive ions (cations) and negative ions (anions). Examples of the ionic liquid include a sulfonium salt, an imidazolium salt, a quaternary ammonium salt, and a lithium salt. The kind of the ionic liquid can be set to one kind or two kinds or more. Lithium ions can be supplied, for example, from the lithium salt. Examples of the lithium salt include LiCl, $LiBF_4$, $LiPF_6$, $LiAsF_6$, $LiClO_4$, $LiCF_3SO_3$, $LiN(FSO_2)_2$, $Li[N(FSO_2)(CF_3SO_2)]$, $LiN(CF_3SO_2)_2$, $LiN(C_2F_5SO_2)_2$, $Li(CF_3SO_2)_3C$, and $LiB[(OCO)_2]_2$. The kind of the lithium salt to be used can be set to one kind or two kinds or more. The amount of the lithium salt dissolved in the ionic liquid is preferably 0.01 mol/kg or more and 2 mol/kg or less. A more preferable lithium salt is at least one of $LiN(FSO_2)_2$, $Li[N(FSO_2)(CF_3SO_2)]$, or $LiN(CF_3SO_2)_2$. These lithium salts have a high degree of dissociation in the ionic liquid, can increase the concentration of the lithium ion of the ionic liquid, and can reduce the viscosity of the nonaqueous electrolyte.

Examples of the sulfonium salt, the imidazolium salt, and the quaternary ammonium salt are as described above.

(8) Container Member

The secondary battery may include a container member. The container member includes a container having an opening portion, and a lid attachable to the opening portion of the container. The lid may be separated from or integral with the container. The container member is not limited to the structure shown in the drawings as long as the container member is capable of housing a positive electrode, a negative electrode, a separator, and a nonaqueous electrolyte. A container member having a shape corresponding to a prismatic, thin, cylindrical, or coin-shaped battery may be used.

Examples of the material constituting the container member include a metal and a laminate film.

Examples of the metal include iron, stainless steel, aluminum, and nickel. When a metal can is used for the container, the plate thickness of the container is preferably 0.5 mm or less, and more preferably in the range of 0.3 mm or less.

Examples of the laminate film include a multilayer film configured of an aluminum foil or stainless steel foil covered with a resin film. As the resin, a polymer such as polypropylene (PP), polyethylene (PE), nylon, or polyethylene terephthalate (PET) can be used. The thickness of the laminate film is preferably 0.2 mm or less.

A method for identifying components of an electrolyte such as a nonaqueous electrolyte will be described below.

First, a secondary battery to be measured is discharged at 1 C until a battery voltage reaches 1.0 V. The discharged secondary battery is disassembled in a glove box with an inert atmosphere. Next, a nonaqueous electrolyte included in the battery and an electrode group is extracted. When the nonaqueous electrolyte can be taken out from a place where the battery is opened, the nonaqueous electrolyte is sampled as it is. Meanwhile, when the nonaqueous electrolyte to be measured is held in the electrode group, the electrode group is further disassembled, and for example, a separator impregnated with the nonaqueous electrolyte is taken out. The nonaqueous electrolyte impregnated in the separator can be extracted using, for example, a centrifuge or the like. Thus, the nonaqueous electrolyte can be sampled. When the amount of the nonaqueous electrolyte included in the secondary battery is small, the nonaqueous electrolyte can be extracted by immersing an electrode and the separator in an acetonitrile solution. The weight of the acetonitrile solution is measured before and after the extraction, whereby an extraction amount can be calculated.

The nonaqueous electrolyte sample thus obtained is subjected to, for example, gas chromatography-mass spectrometry (GC-MS) or nuclear magnetic resonance (NMR) for composition analysis. In the analysis, first, components included in the nonaqueous electrolyte are identified. Next, a calibration curve for each of the components is produced. When multiple types of components are included, a calibration curve for each of the components is produced. By comparing the produced calibration curve with peak intensity or area in the results obtained by measuring the nonaqueous electrolyte sample, the composition of the electrolyte such as the nonaqueous electrolyte can be obtained.

Figure 1:
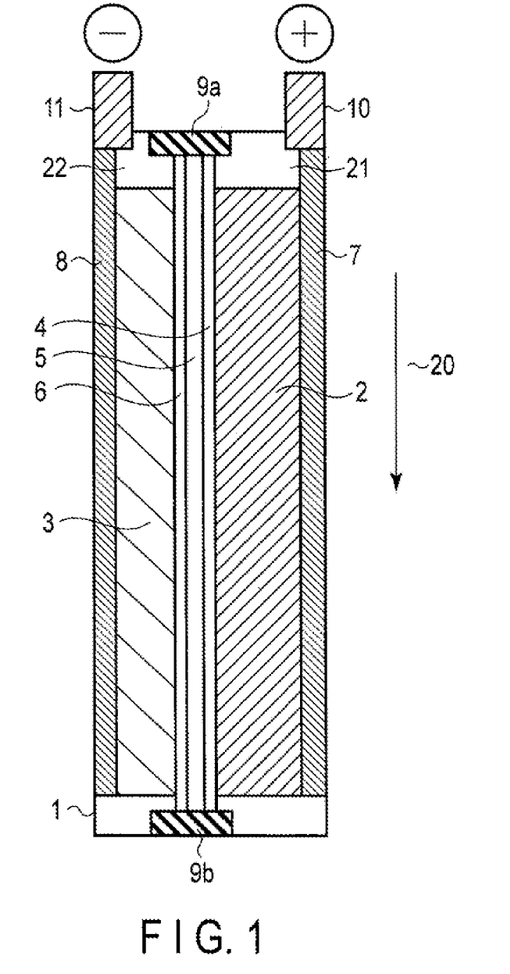
FIG. 1 is a cross-sectional view of a secondary battery according to an embodiment, taken in parallel with a first direction.

An example of the secondary battery is shown in FIG. 1. FIG. 1 shows a cross section of the secondary battery taken along a first direction 20. The secondary battery includes a container member 1, an electrode group housed in the container member 1, a positive electrode terminal 10, and a negative electrode terminal 11. The positive electrode terminal 10 and the negative electrode terminal 11 are formed of, for example, Cu or a Cu alloy. The container member 1 includes a rectangular cylindrical container provided with a bottom plate on one side, and a lid plate. The opposite side of the bottom plate of the container serves as an opening portion, and the lid plate is fixed to the opening portion by, for example, welding or caulking. The electrode group includes a positive electrode active material-containing layer 2, a negative electrode active material-containing layer 3, a first porous layer 4, a lithium-ion conductive separator 5, a second porous layer 6, a positive electrode current collector 7, and a negative electrode current collector 8. The positive electrode current collector 7 and the negative electrode current collector 8 are formed of, for example, Cu or a Cu alloy. The positive electrode active material-containing layer 2 and the negative electrode active material-containing layer 3 are stacked so as to face each other with the first porous layer 4, the lithium-ion conductive separator 5 and the second porous layer 6 interposed therebetween. The first direction 20 is a direction orthogonal to the stacking direction. The first porous layer 4 holds or is impregnated with a nonaqueous electrolyte including chlorine ions. The first porous layer 4 is in contact with one surface (for example, one surface or a principal surface intersecting the thickness direction) of the positive electrode active material-containing layer 2. The positive electrode current collector 7 is in contact with the other surface of the positive electrode active material-containing layer 2. The second porous layer 6 holds or is impregnated with a nonaqueous electrolyte including lithium ions. The second porous layer 6 is in contact with one surface (for example, one surface or a principal surface intersecting the thickness direction) of the negative electrode active material-containing layer 3. The negative electrode current collector 8 is in contact with the other surface of the negative electrode active material-containing layer 3. Both end portions of each of the first porous layer 4, the lithium-ion conductive separator 5, and the second porous layer 6 in the first direction 20 protrude from the positive electrode active material-containing layer 2 and the negative electrode active material-containing layer 3. An insulating support 9a is disposed between one end portion of each of the first porous layer 4, the lithium-ion conductive separator 5, and the second porous layer 6 in the first direction 20, and the back surface of the lid plate. An insulating support 9b is disposed between the other end portion of each of the first porous layer 4, the lithium-ion conductive separator 5, and the second porous layer 6 in the first direction 20, and the bottom surface. The lithium-ion conductive separator 5 is a film which is selectively permeable to lithium ions and which is free from holes or has a non-communicating structure. The inside of the container member 1 is partitioned into two spaces by the lithium-ion conductive separator 5, and there exist a space (positive electrode space) 21 defined by the separator 5, the insulating supports 9a and 9b, and the container member, and a space (negative electrode space) 22 defined by the separator 5, the insulating supports 9a and 9b, and the container member. The nonaqueous electrolyte including chlorine ions (first nonaqueous electrolyte) in the positive electrode space 21 and the nonaqueous electrolyte including lithium ions (second nonaqueous electrolyte) in the negative electrode space 22 do not mix with each other, and exist independently of each other.

The positive electrode terminal 10 and the negative electrode terminal 11 are provided on the lid plate with an insulating member (not shown). The positive electrode terminal 10 functions as an external positive electrode terminal and the negative electrode terminal 11 functions as an external negative electrode terminal. The positive electrode current collector 7 is electrically connected to the positive electrode active material-containing layer 2 and positive electrode terminal 10. Meanwhile, the negative electrode current collector 8 is electrically connected to the negative electrode active material-containing layer 3 and negative electrode terminal 11.

According to the secondary battery having the structure shown in FIG. 1, since the lithium-ion conductive separator 5 can function as a partition wall, the contact between the nonaqueous electrolyte including chlorine ions and the nonaqueous electrolyte including lithium ions can be prevented. The secondary battery may have a structure which allows charge and discharge, and is not limited to the structure shown in FIG. 1.

The secondary battery according to the first embodiment includes: the positive electrode including the halide including at least one metal element selected from the group consisting of copper, iron, nickel, cobalt, tin, and zinc, as the positive electrode active material; the negative electrode; the nonaqueous electrolyte including chlorine ions; and the separator having lithium ion conductivity. According to the secondary battery, the oxidation-reduction reactions according to the dissolution and deposition of the metal element of the halide efficiently proceed, which enables charge and discharge with a high coulomb efficiency and improvement in the cycle life performance. Since the level of safety is high even if lithium metal is used for the negative electrode, a secondary battery with a voltage of 3 V which is lightweight and has a high energy density and capacity can be achieved. Furthermore, the secondary battery, by virtue of its high energy density, is suitable for a stationary power supply and space applications.

Second Embodiment

According to a second embodiment, a battery pack is provided. The battery pack includes the secondary battery according to the first embodiment. The battery pack may include one secondary battery according to the one embodiment or include a battery module including a plurality of the secondary batteries according to the one embodiment.

The battery pack according to the second embodiment may further include a protective circuit. The protective circuit has a function to control the charge and discharge of the secondary battery. Alternatively, a circuit included in equipment (for example, electronic devices, automobiles, and the like) where the battery pack serves as a power source may be used as the protective circuit for the battery pack.

Moreover, the battery pack according to the second embodiment may further include an external power distribution terminal. The external power distribution terminal is configured to externally output current from the secondary battery, and/or to input external current into the secondary battery. In other words, when the battery pack is used as a power source, the current is provided to the external via the external power distribution terminal. When the battery pack is charged, the charging current (including regenerative energy of motive force of vehicles such as automobiles) is provided to the battery pack via the external power distribution terminal.

Next, an example of the battery pack according to the second embodiment will be described with reference to the drawings.

Figure 2:
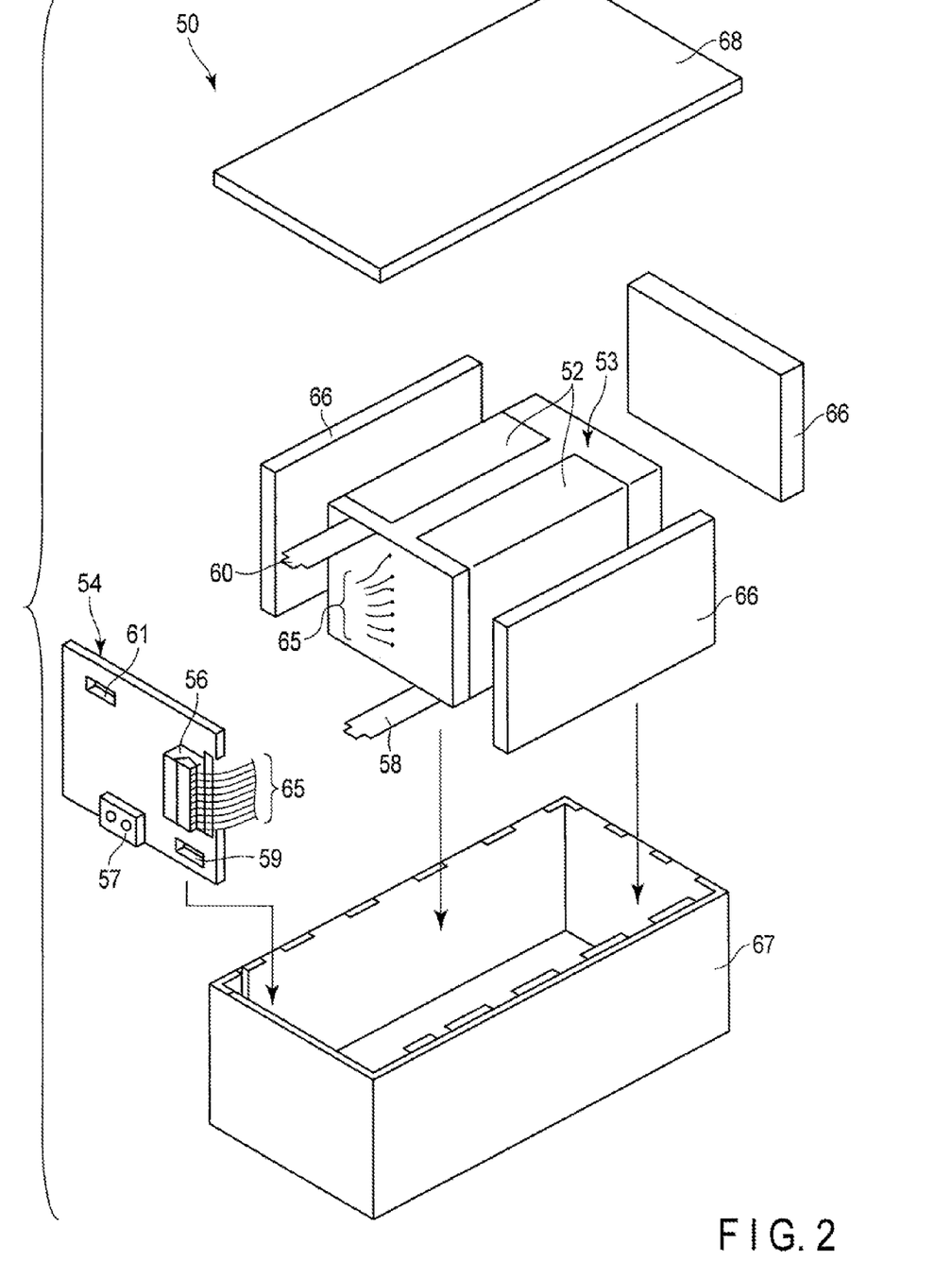
FIG. 2 is an exploded perspective view schematically showing an example of a battery pack according to an embodiment.
Figure 3:
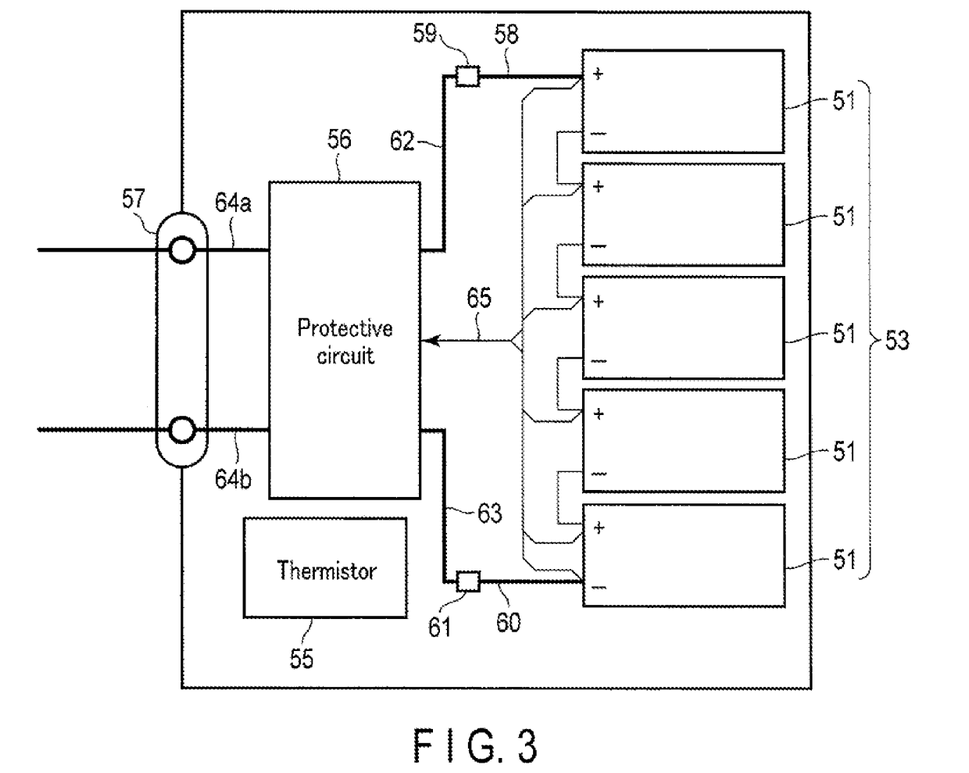
FIG. 3 is a block diagram showing an example of an electric circuit of the battery pack shown in FIG. 2.

FIG. 2 is an exploded perspective view schematically showing an example of the battery pack disassembled for each part according to the second embodiment, FIG. 3 is a block diagram showing an example of an electric circuit of the battery pack shown in FIG. 2.

FIGS. 2 and 3 show an example of a battery pack 50. The battery pack 50 shown in FIGS. 2 and 3 includes plural secondary batteries according to the embodiment. Plural secondary batteries 51 are stacked so that the negative electrode terminals and the positive electrode terminals are arranged in the same direction, and fastened with an adhesive tape 52 to configure a battery module 53. These secondary batteries 51 are electrically connected to each other in series as shown in FIG. 3.

Figure 5:
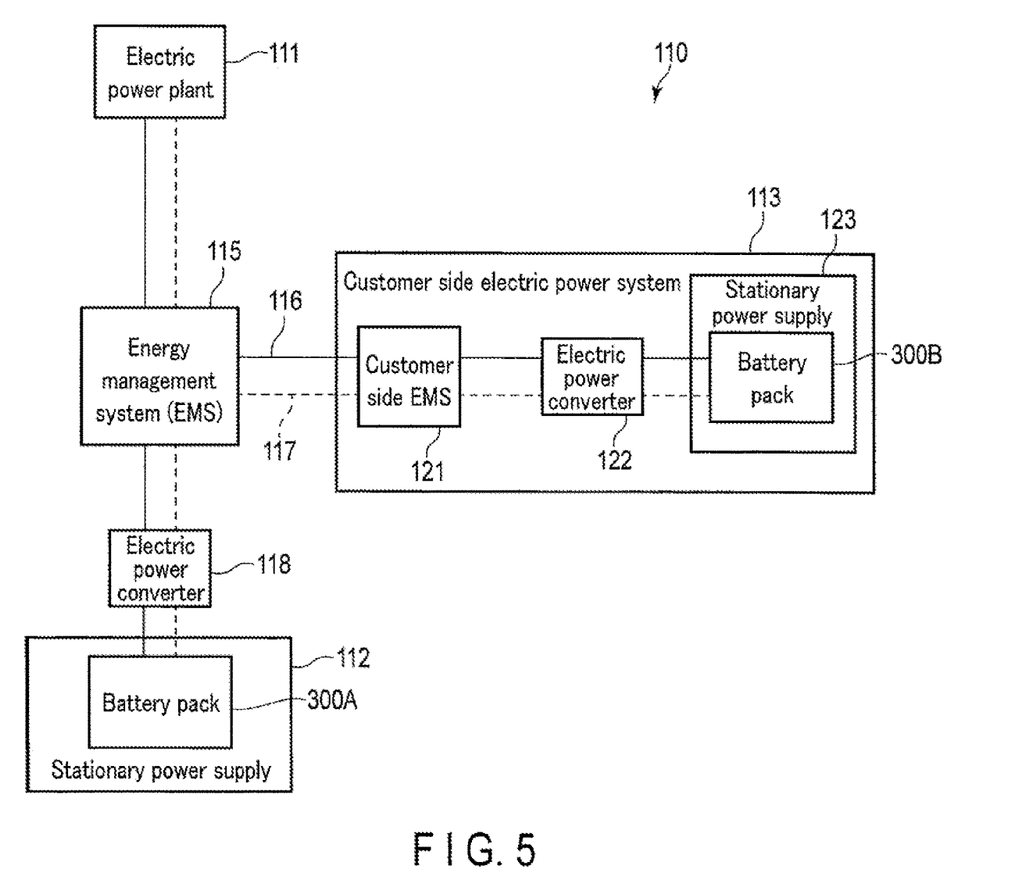
FIG. 5 is a block diagram showing an example of a system including a stationary power supply according to an embodiment.

A printed wiring board 54 is arranged to face the side plane of the secondary battery 51 where the negative electrode terminal and the positive electrode terminal extend out from. A thermistor 55, a protective circuit 56, and a power distribution terminal 57 to an external device as the external power distribution terminal are mounted on the printed wiring board 54 as shown in FIG. 5. An electric insulating plate (not shown) is attached to the surface of the printed wiring board 54 facing the battery module 53 to avoid unnecessary connection of the wires of the battery module 53.

A positive electrode-side lead 58 is connected to the positive electrode terminal located at the bottom layer of the battery module 53 and the distal end of the lead 58 is inserted into a positive electrode-side connector 59 of the printed wiring board 54 so as to be electrically connected. A negative electrode-side lead 60 is connected to the negative electrode terminal located at the top layer of the battery module 53 and the distal end of the lead 60 is inserted into a negative electrode-side connector 61 of the printed wiring board 54 so as to be electrically connected. The connectors 59 and 61 are connected to the protective circuit 56 through wires 62 and 63 formed on the printed wiring board 54.

The thermistor 55 detects the temperature of the secondary batteries 51, and the detection signal is sent to the protective circuit 56. The protective circuit 56 can shut down a plus-side wire 64a and a minus-side wire 64b between the protective circuit 56 and the power distribution terminal 57 to an external device under a predetermined condition. The predetermined condition indicates, for example, the case where the temperature detected by the thermistor 55 becomes a predetermined temperature or more. Another example of the predetermined condition indicates the case where the overcharge, overdischarge, or over-current of the secondary batteries 51 is detected. The detection of the overcharge and the like is performed on individual secondary batteries 51 or the entire secondary batteries 51. When each of the secondary batteries 51 is detected, the battery voltage may be detected, or a positive electrode or negative electrode potential may be detected. In the latter case, a lithium electrode to be used as a reference electrode is inserted into each of the secondary batteries 51. In the case of the battery pack of FIGS. 2 and 3, wires 65 for voltage detection are connected to each of the secondary batteries 51. Detection signals are sent to the protective circuit 56 through the wires 65.

Protective sheets 66 made of rubber or resin are arranged on three side planes of the battery module 53 except the side plane from which the positive electrode terminal and the negative electrode terminal protrude out.

The battery module 53 is housed in a housing container 67 together with each of the protective sheets 66 and the printed wiring board 54. That is, the protective sheets 66 are arranged on both internal surfaces in a long side direction and on one internal surface in a short side direction of the housing container 67. The printed wiring board 54 is arranged on another internal surface in a short side direction. The battery module 53 is located in a space surrounded by the protective sheets 66 and the printed wiring board 54. A lid 68 is attached to the upper surface of the housing container 67.

In order to fix the battery module 53, a heat-shrinkable tape may be used in place of the adhesive tape 52. In this case, the battery module is bound by placing the protective sheets on the both sides of the battery module, revolving the heat-shrinkable tape, and thermally shrinking the heat-shrinkable tape.

In FIGS. 2 and 3, the form in which the secondary batteries 51 are connected in series is shown. However, in order to increase the battery capacity, the batteries may be connected in parallel. Alternatively, the batteries may be formed by combining series connection and parallel connection. The assembled battery pack can be connected in series or in parallel.

The battery pack shown in FIGS. 2 and 3 includes one battery module. The battery pack according to the embodiments may include a plurality of battery modules. The plurality of battery modules are electrically connected in series, in parallel, or in a combination of series connection and parallel connection.

The embodiments of the battery pack is appropriately changed in accordance with the application purpose. The battery pack according to the embodiment is preferably used for an application purpose requiring that excellent cycle performance is obtained at the time of a large current discharging. More specifically, the battery pack is used as a power supply for a digital camera, a battery for a vehicle such as a two- or four-wheeled hybrid electronic automobile, a two- or four-wheeled electronic automobile, a power-assisted bicycle, or a railway vehicle (for example, an electric train), or a stationary battery. In particular, the battery pack is suitably used as a large-sized storage battery for a stationary power storage system or an in-vehicle battery for vehicles.

The battery pack according to the second embodiment includes the secondary battery according to the first embodiment. Therefore, the battery pack according to the second embodiment has a high capacity and a high energy, and is excellent in cycle life performance.

Third Embodiment

According to a third embodiment, a vehicle is provided. The vehicle includes the battery pack according to the second embodiment.

In the vehicle according to the third embodiment, the battery pack is configured, for example, to recover regenerative energy of motive force of the vehicle. The vehicle may include a mechanism configured to convert kinetic energy of the vehicle into regenerative energy.

Examples of the vehicle include a two- to four-wheeled hybrid electric automobile, a two- to four-wheeled electric automobile, a power-assisted bicycle, and a railway car.

The installation position of the battery pack in the vehicle is not particularly limited. For example, when installing the battery pack on an automobile, the battery pack can be installed in the engine compartment of the vehicle, in rear parts of the vehicle body, or under seats.

The vehicle may include plural battery packs. In this case, the battery packs may be electrically connected in series, connected in parallel, or connected in a combination of in series connection and in parallel connection.

Next, an example of the vehicle according to the third embodiment is explained with reference to the drawings.

Figure 4:
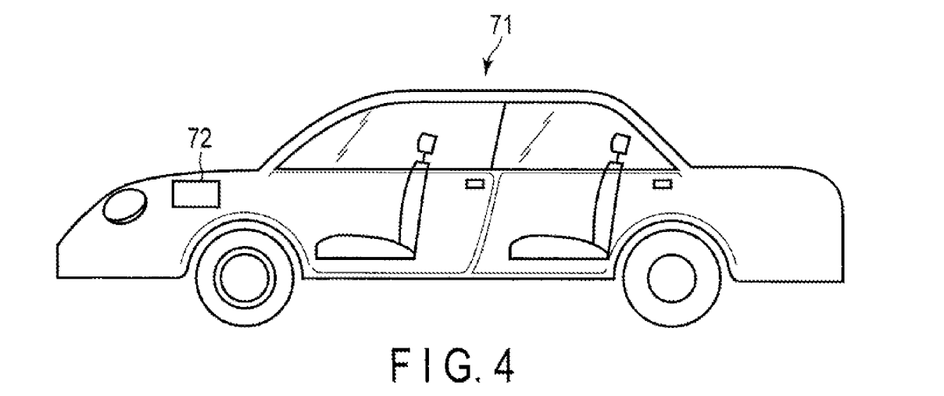
FIG. 4 is a cross-sectional view schematically showing an example of a vehicle according to an embodiment.

FIG. 4 is a cross-sectional view schematically showing an example of the vehicle according to the third embodiment.

The vehicle 71 shown in FIG. 4 includes a vehicle body and a battery pack 72 according to the second embodiment. In the example shown in FIG. 4, the vehicle 71 is a four-wheeled automobile.

The vehicle 71 may include plural battery packs 72. In this case, the battery packs 72 may be connected in series, may be connected in parallel, or may be connected by a combination of in-series connection and in-parallel connection.

In FIG. 4, the battery pack 72 is installed in an engine compartment located at the front of the vehicle body. As described above, the battery pack 72 may be installed in rear parts of the vehicle body, or under seats. The battery pack 72 may be used as a power source of the vehicle. In addition, the battery pack 72 can recover regenerative energy of motive force of the vehicle.

The vehicle according to the third embodiment includes the battery pack according to the second embodiment. Thus, the present embodiment can provide a vehicle that includes a battery pack having a high capacity, high energy and excellent cycle life performance.

Fourth Embodiment

According to a fourth embodiment, a stationary power supply is provided. The stationary power supply includes the battery pack according to the second embodiment. Note that the stationary power supply may include the secondary battery or the battery module according to the embodiment, instead of the battery pack according to the second embodiment.

FIG. 5 is a block diagram showing an example of a system including a stationary power supply according to the fourth embodiment. FIG. 5 is a diagram showing an application example to stationary power supplies 112, 123 as an example of use of battery packs 300A, 300B according to the second embodiment. In the example shown in FIG. 5, a system 110 in which the stationary power supplies 112, 123 are used is shown. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel sources such as thermal power or nuclear power. Electric power is supplied from the electric power plant 111 through the electric power network 116 and the like. In addition, the battery pack 300A is installed in the stationary power supply 112. The battery pack 300A can store electric power and the like supplied from the electric power plant 111. In addition, the stationary power supply 112 can supply the electric power stored in the battery pack 300A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 300A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 3002 is installed in the stationary power supply 123. The customer side EMS 121 performs control to stabilize the customer side electric power system 113.

Electric power from the electric power plant 111 and electric power from the battery pack 300A are supplied to the customer side electric power system 113 through the electric power network 116. The battery pack 3003 can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 300B.

Note that the electric power stored in the battery pack 300B can be used, for example, for charging a vehicle such as an electric automobile. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

The stationary power supply according to the fourth embodiment includes the battery pack according to the second embodiment. Thus, the present embodiment can provide a stationary power supply that includes a battery pack having a high capacity, high energy and excellent cycle life performance.

EXAMPLES

Hereinafter, examples will be described in detail with reference to the drawings; however, the embodiment is not limited to the examples described blow.

Example 1

A positive electrode active material-containing layer was produced, which included copper (II) chloride ($CuCl_2$) as a positive electrode active material, acetylene black, graphite, and a polyethylene terephthalate binder (PTFE) at a weight ratio of 80:10:5:5. The positive electrode active material-containing layer was attached by pressure to a copper mesh current collector having a thickness of 15 μm. The total thickness after attaching by pressure was 410 μm, and the density of the positive electrode active material-containing layer was 2 g/cm$^3$. As a nonaqueous electrolyte in contact with the positive electrode, a nonaqueous electrolyte was prepared, in which 0.2 mol/kg of $Li(CF_3SO_2)_2N$ (LiTFSI) and 0.1 mol/kg of LiCl were dissolved in $S(C_2H_5)(CF_3SO_2)_2N$ (hereinafter referred to as S222TFSI) as a triethylsulfonium salt. A positive electrode was produced by injecting the obtained nonaqueous electrolyte into a positive electrode active material-containing layer so that the content of the nonaqueous electrolyte in the positive electrode active material-containing layer was set to 40% by weight.

A first porous layer made of a cellulose nonwoven fabric having a thickness of 15 μm and a porosity of 60% was provided on the surface of the positive electrode active material-containing layer in the surface of the positive electrode, in other words, the surface of the positive electrode facing the separator. The first porous layer was made to include an ionic liquid having the same composition as above.

A lithium metal foil having a thickness of 250 μm was attached by pressure to a copper current collector foil having a thickness of 10 μm to produce a negative electrode. The capacity of the lithium metal was four times the capacity of the positive electrode. A second porous layer made of a cellulose nonwoven fabric having a thickness of 15 μm and a porosity of 60% was provided on the surface of the lithium metal foil of the negative electrode. A nonaqueous electrolyte was prepared, which was obtained by dissolving 0.3 mol/kg of LiTFSI in $S_{222}$TFSI as a triethylsulfonium salt. A second porous layer was made to include the nonaqueous electrolyte.

A lithium ion conductive solid electrolyte plate represented by $Li_{1.3}Al_{0.3}Ti_{1.7}(PO_4)_3$ and having a thickness of 50 μm was provided as a separator between the positive electrode and the negative electrode. This prevents the ionic liquid in the positive electrode from contacting with the lithium metal of the negative electrode. The obtained electrode group was housed in a container composed of a stainless laminate film and having a thickness of 0.1 mm, to produce a thin secondary battery having a size of 1×105×105 mm, a capacity of 2.1 Ah, an average voltage of 2.8 V, and a volumetric energy density of 533 Wh/l, and having the structure shown in FIG. 1 described above.

Examples 2 to 7 and 10 to 20

Secondary batteries were produced in the same manner as in Example 1 except that positive electrode active materials, ionic liquids for positive electrodes, concentrations of lithium salts (mol/kg) in the ionic liquid for the positive electrodes, concentrations of chlorides (mol/kg) in the ionic liquids for the positive electrode, types of separators, and setting negative electrodes as shown in Table 1 below. Values in parentheses in columns for lithium salts and chlorides in Table 1 indicate concentrations (mol/kg).

A composite film of Example 10 was produced by the following method. $Li_{1.3}Al_{0.3}Ti_{1.7}(PO_4)$ particles having a specific surface area of 50 m$^2$/g determined by the BET method based on $N_2$ adsorption and an average size (diameter) of primary particle of 0.1 μm, polyethylene oxide (PEO), and LiTFSI were mixed at a weight ratio of 1:1:1 to form a composite. The obtained composition was applied to the surfaces of a positive electrode active material-containing layer of the positive electrode and a negative electrode active material-containing layer of the negative electrode, and heat-treated at 60° C. for 24 hours, to form a composite film. The content of the lithium-ion conductive inorganic solid electrolyte in the composite film was 33.3% by weight. The content of the lithium salt in the composite film was 33.3% by weight. The thickness of the composite film was 50 μm.

As the negative electrode of Example 11, a negative electrode was produced by attaching a foil having a thickness of 50 μm and made of a LiAl alloy (the Al content in the alloy was 50% by weight) to a copper foil current collector having a thickness of 10 μm by pressure.

The negative electrode of Example 20 was produced by the following method. Graphite powder and polyvinylidene fluoride (PVdF) were mixed at a weight ratio of 90:10, and the obtained mixture was kneaded in the presence of an organic solvent (N-methylpyrrolidone) to prepare a slurry. The obtained slurry was applied to a copper foil having a thickness of 15 μm, dried, and pressed to obtain the negative electrode. Lithium was inserted into the obtained negative electrode before the first cycle discharge.

Example 8

A nonaqueous electrolyte to be in contact with a positive electrode was prepared by the following method. A nonaqueous electrolyte was prepared, in which 0.2 mol/kg of $Li(CF_3SO_2)_2N$(LiTFSI) and 0.1 mol/kg of LiCl were dissolved in an ionic liquid represented by TMPATFSI composed of trimethylpropylammonium cation and $(CF_3SO_2)_2N$ anion. A positive electrode was produced by injecting the obtained nonaqueous electrolyte into a positive electrode active material-containing layer so that the content of the nonaqueous electrolyte in the positive electrode active material-containing layer was set to 40% by weight.

A nonaqueous electrolyte to be in contact with a negative electrode was prepared by the following method. The nonaqueous electrolyte was prepared, in which 0.3 mol/kg of LiTFSI was dissolved in an ionic liquid represented by TMPATFSI. A second porous layer was made to include the nonaqueous electrolyte.

A thin secondary battery was produced in the same manner as described in Example 1 except that nonaqueous electrolytes of the positive electrode and the negative electrode were changed as described above.

Example 9

A nonaqueous electrolyte to be in contact with a positive electrode was prepared by the following method. The nonaqueous electrolyte was prepared, in which 0.2 mol/kg of Li $(CF_3SO_2)_2N$(LiTFSI) and 0.1 mol/kg of LiCl were dissolved in an ionic liquid represented by MEITFSI composed of 1-methyl-3-ethylimidazolium cation and $(CF_3SO_2)_2N$ anion. A positive electrode was produced by injecting the obtained nonaqueous electrolyte into a positive electrode active material-containing layer so that the content of the nonaqueous electrolyte in the positive electrode active material-containing layer was set to 40% by weight.

A nonaqueous electrolyte to be in contact with a negative electrode was prepared by the following method. A nonaqueous electrolyte was prepared, in which 0.3 mol/kg of LiTFSI was dissolved in an ionic liquid represented by MEITFSI. A second porous layer was made to include the nonaqueous electrolyte.

A thin secondary battery was produced in the same manner as described in Example 1 except that nonaqueous electrolytes of the positive electrode and the negative electrode were changed as described above.

Comparative Example 1

A Swagelok-type cell was prepared, which had a structure where an anode composed of a lithium metal foil having a thickness of 250 μm and an aqueous cathode composed of 30% by weight of a $CuCl_2$ aqueous solution were separated by a lithium-ion conductive solid electrolyte plate represented by $Li_{1.3}Al_{0.3}Ti_{1.7}(PO_4)_3$ and having a thickness of 50 μm.

Comparative Example 2

A Swagelok-type cell was prepared in the same manner as in Comparative Example 1 except that 30% by weight of a $FeCl_2$ aqueous solution was used as an aqueous cathode.

Comparative Example 3

A Swagelok-type cell was prepared in the same manner as in Comparative Example 1 except that 30% by weight of a $NiCl_2$ aqueous solution was used as an aqueous cathode.

Comparative Example 4

$LiFePO_4$ was used as a positive electrode active material. With 90% by weight of the positive electrode active material, 5% by weight of acetylene black as a conductive agent and 5% by weight of PVdF as a binder were blended. These were dispersed in an n-methylpyrrolidone (NMP) solvent to prepare a slurry. The slurry was then applied to both surfaces of an aluminum alloy foil (purity: 99%) having a thickness of 15 μm, dried, and subjected to a pressing process to produce a positive electrode including a positive electrode active material-containing layer having a thickness of 38 μm per surface and an electrode density of 2.0 g/cm$^3$.

A negative electrode was produced in the same manner as described in Example 1.

A separator composed of a polyethylene (PE) porous film having a thickness of 12 μm was disposed between the positive electrode and the negative electrode to produce an electrode group. The electrode group was housed in a container composed of a stainless steel laminate film having a thickness of 0.1 mm.

Lithium hexafluorophosphate ($LiPF_6$) as a lithium salt was dissolved at 1 mol/L in propylene carbonate (PC) as an organic solvent to prepare a liquid organic electrolyte (nonaqueous electrolytic solution). The nonaqueous electrolyte was injected into the electrode group in the container to produce a secondary battery.

Comparative Example 5

A positive electrode and a negative electrode were produced in the same manner as described in Example 1. A separator composed of a polyethylene (PE) porous film having a thickness of 12 μm was disposed between the positive electrode and the negative electrode to produce an electrode group. The electrode group was housed in a container composed of a stainless steel laminate film having a thickness of 0.1 mm.

Lithium hexafluorophosphate ($LiPF_6$) as a lithium salt was dissolved at 1 mol/L in methyldifluoroacetate as an organic solvent to prepare a liquid organic electrolyte (nonaqueous electrolytic solution). The nonaqueous electrolyte was injected into the electrode group in the container to produce a secondary battery.

Comparative Example 6

As a nonaqueous electrolyte for a positive electrode and a negative electrode, a liquid organic electrolyte prepared by dissolving lithium hexafluorophosphate ($LiPF_6$) at 1 mol/L as a lithium salt in propylene carbonate (PC) was used. A secondary battery was produced in the same manner as in Example 1 except for this.

Comparative Example 7

LiCl was not added to the nonaqueous electrolyte for the positive electrode. As a separator, a lithium-ion conductive solid electrolyte plate represented by $Li_{1.3}Al_{0.3}Zr_{1.7}(PO_4)_3$ and having a thickness of 50 μm was prepared. Except for these, a secondary battery was produced in the same manner as in Example 1.

Comparative Example 8

$LiFePO_4$ was used as a positive electrode active material. With 90% by weight of the positive electrode active material, 5% by weight of acetylene black as a conductive agent and 5% by weight of PVdF as a binder were blended. These were dispersed in an n-methylpyrrolidone (NMP) solvent to prepare a slurry. The slurry was then applied to both surfaces of an aluminum alloy foil (purity: 99%) having a thickness of 15 μm, dried, and subjected to a pressing process to produce a positive electrode including a positive electrode active material-containing layer having a thickness of 38 μm per surface and an electrode density of 2.0 g/cm³.

A negative electrode was produced in the same manner as described in Example 1.

A separator composed of a polyethylene (PE) porous film having a thickness of 12 μm was disposed between the positive electrode and the negative electrode to produce an electrode group. The electrode group was housed in a container composed of a stainless steel laminate film having a thickness of 0.1 mm.

A nonaqueous electrolyte was prepared, which was obtained by dissolving LiTFSI at 0.2 mol/kg in $S_{222}TFSI$. The nonaqueous electrolyte was injected into the electrode group in the container to produce a secondary battery.

Comparative Example 9

A Swagelok-type cell was prepared, which had a structure where an anode composed of a lithium metal foil having a thickness of 250 μm and an aqueous cathode composed of 30% by weight of a $CoCl_2$ aqueous solution were separated by a lithium-ion conductive solid electrolyte plate represented by $Li_{1.4}Al_{0.4}Ge_{0.2}Ti_{1.7}(PO_4)_3$ and having a thickness of 50 μm.

Comparative Example 10

As described in lines 39 to 65 on column 7 of U.S. Pat. No. 5,552,241, $SCl_3AlCl_4$ as a positive electrode was dissolved in a molten salt obtained by mixing 65 mol % of $AlCl_3$ and 35 mol % of 1,2-dimethyl-4-fluoropyrazolium chloride (DMFP). A negative electrode made of Li metal was disposed in the resultant so that the positive electrode and the negative electrode were separated by a separator composed of a glass filter, to produce a lithium battery.

For each of the obtained batteries of Examples and Comparative Examples, a discharge capacity (Ah), an average voltage (V), and energy (Wh) were measured when the battery was charged at a constant current of 100 mA at 30° C. for 10 hours to reach 3.6 V and then discharged at 100 mA to reach 1.5 V. As a high-temperature charge and discharge cycle test, a charge-discharge cycle in which the battery was charged at a constant current of 200 mA at 60° C. for 10 hours to reach 3.6 V and then discharged at 200 mA to reach 1.5 V was repeated to determine the number of cycles at which the capacity retention ratio became 80% as a cycle life number at 60° C. These measurement results are shown in Tables 3 and 4 below.

TABLE 1

| Table 1 | Positive electrode active material | Ionic liquid of positive electrode | Lithium salt concentration (mol/kg) | Chloride concentration (mol/kg) | Separator | Negative electrode |
|---|---|---|---|---|---|---|
| Example 1 | $CuCl_2$ | S222TFSI | LiTFSI (0.2) | LiCl (0.1) | $Li_{1.3}Al_{0.3}Ti_{1.7}(PO_4)_3$ | Li |
| Example 2 | $NiCl_2$ | S222TFSI | LiTFSI (0.2) | LiCl (0.1) | $Li_{1.3}Al_{0.3}Ti_{1.7}(PO_4)_3$ | Li |
| Example 3 | $CoCl_2$ | S222TFSI | LiTFSI (0.2) | LiCl (0.1) | $Li_{1.3}Al_{0.3}Ti_{1.7}(PO_4)_3$ | Li |
| Example 4 | $SnCl_2$ | S222TFSI | LiTFSI (0.2) | LiCl (0.1) | $Li_{1.3}Al_{0.3}Ti_{1.7}(PO_4)_3$ | Li |
| Example 5 | $ZnCl_2$ | S222TFSI | LiTFSI (0.2) | LiCl (0.1) | $Li_{1.3}Al_{0.3}Ti_{1.7}(PO_4)_3$ | Li |
| Example 6 | $CuF_2$ | S222TFSI | LiTFSI (0.2) | LiCl (0.1) | $Li_{1.3}Al_{0.3}Ti_{1.7}(PO_4)_3$ | Li |
| Example 7 | $FeF_3$ | S222TFSI | LiTFSI (0.2) | LiCl (0.1) | $Li_{1.3}Al_{0.3}Ti_{1.7}(PO_4)_3$ | Li |
| Example 8 | $CuCl_2$ | TMPATFSI | LiTFSI (0.2) | LiCl (0.1) | $Li_{1.3}Al_{0.3}Ti_{1.7}(PO_4)_3$ | Li |
| Example 9 | $CuCl_2$ | MEITFSI | LiTFSI (0.2) | LiCl (0.1) | $Li_{1.3}Al_{0.3}Ti_{1.7}(PO_4)_3$ | Li |
| Example 10 | $CuCl_2$ | S222TFSI | LiTFSI (0.2) | LiCl (0.1) | PEO/$Li_{1.3}Al_{0.3}Ti_{1.7}(PO_4)_3$/LiTFSI composite film | Li-Al alloy |
| Example 11 | $CuCl_2$ | S222TFSI | LiTFSI (0.2) | LiCl (0.1) | $Li_{1.3}Al_{0.3}Ti_{1.7}(PO_4)_3$ | Li |
| Example 12 | $CuCl_3$ | S222TFSI | $LiPF_6$ (0.2) | LiCl (0.1) | $Li_{1.3}Al_{0.3}Ti_{1.7}(PO_4)_3$ | Li |
| Example 13 | $CuCl_2$ | S222TFSI | $LiBF_4$ (0.2) | LiCl (0.1) | $Li_{1.3}Al_{0.3}Ti_{1.7}(PO_4)_3$ | Li |
| Example 14 | $CuCl_2$ | S222TFSI | LiTFSI (0.4) | LiCl (0.05) | $Li_7La_3Zr_2O_{12}$ | Li |
| Example 15 | $FeCl_3$ | S222TFSI | LiTFSI (0.2) | LiCl (0.2) | $Li_{1.3}Al_{0.3}Ti_{1.7}(PO_4)_3$ | Li |
| Example 16 | $CuCl_2$ | S222TFSI | LiFSI (0.5) | LiCl (0.05) | $Li_{1.3}Al_{0.3}Ti_{1.7}(PO_4)_3$ | Li |
| Example 17 | $CuCl_2$ | S222TFSI | LiTFSI (0.1) | LiCl (0.3) | $Li_{1.3}Al_{0.3}Ti_{1.7}(PO_4)_3$ | Li |
| Example 18 | $CuCl_2$ | S222TFSI | LiTFSI (1) | LiCl (0.05) | $Li_{1.3}Al_{0.3}Ti_{1.7}(PO_4)_3$ | Li |
| Example 19 | $NiCl_2$ | S222TFSI | LiTFSI (0.2) | LiCl (0.1) | $Li_7La_3Zr_2O_{12}$ | Li |
| Example 20 | $CoCl_2$ | S222TFSI | LiTFSI (0.2) | LiCl (0.1) | $Li_{1.3}Al_{0.3}Ti_{1.7}(PO_4)_3$ | Li-graphite |

TABLE 2

| Table 2 | Positive electrode active material | Electrolytic solution | Lithium salt concentration (mol/kg) | Chloride concentration (mol/kg) | Separator | Negative electrode |
|---|---|---|---|---|---|---|
| Comparative Example 1 | $CuCl_2$ | $CuCl_2$ aqueous solution (30% by weight) | — | — | $Li_{1.3}Al_{0.3}Ti_{1.7}(PO_4)_3$ | Li |
| Comparative Example 2 | $FeCl_2$ | $FeCl_2$ aqueous solution (30% by weight) | — | — | $Li_{1.3}Al_{0.3}Ti_{1.7}(PO_4)_3$ | Li |
| Comparative Example 3 | $NiCl_2$ | $NiCl_2$ aqueous solution (30% by weight) | — | — | $Li_{1.3}Al_{0.3}Ti_{1.7}(PO_4)_3$ | Li |
| Comparative Example 4 | $LiFePO_4$ | — | — | — | PE separator/1M $LiPF_6$-propylene carbonate | Li |
| Comparative Example 5 | $CuCl_2$ | — | — | — | PE separator/1M $LiPF_6$-methyldifluoroacetate | Li |
| Comparative Example 6 | $CuCl_2$ | 1M $LiPF_6$-propylene carbonate | — | — | $Li_{1.3}Al_{0.3}Ti_{1.7}(PO_4)_3$ | Li |
| Comparative Example 7 | $CuCl_2$ | S222TFSI | LiTFSI (0.2) | — | $Li_{1.3}Al_{0.3}Zr_{1.7}(PO_4)_3$ | Li |
| Comparative Example 8 | $LiFePO_4$ | S222TFSI | LiTFSI (0.2) | — | PE separator | Li |
| Comparative Example 9 | $CoCl_2$ | $CoCl_2$ aqueous solution (30% by weight) | — | — | $Li_{1.4}Al_{0.4}Ge_{0.2}Ti_{1.7}(PO_4)_3$ | Li |
| Comparative Example 10 | $SCl_3AlCl_4$ | $AlCl3/DMFP(65/35$ mol %) | | | Glass filter | Li |

TABLE 3

| | Discharge capacity (Ah) | Average voltage (V) | Energy (Wh) | Cycle life number at 60° C. |
|---|---|---|---|---|
| Example 1 | 2.1 | 2.8 | 5.88 | 800 |
| Example 2 | 1.8 | 2.5 | 4.5 | 700 |
| Example 3 | 1.9 | 2.5 | 4.75 | 600 |
| Example 4 | 1.7 | 2.4 | 4.08 | 700 |
| Example 5 | 2.2 | 1.9 | 4.18 | 500 |
| Example 6 | 1.8 | 2.8 | 5.04 | 350 |
| Example 7 | 1.8 | 2.4 | 4.32 | 600 |
| Example 8 | 9.1 | 2.8 | 5.88 | 400 |
| Example 9 | 1.5 | 2.6 | 3.9 | 350 |
| Example 10 | 2.0 | 2.7 | 5.4 | 500 |
| Example 11 | 1.5 | 2.5 | 3.75 | 800 |
| Example 12 | 1.8 | 2.6 | 4.68 | 600 |
| Example 13 | 1.7 | 2.6 | 4.42 | 500 |
| Example 14 | 2.2 | 2.85 | 6.27 | 800 |
| Example 15 | 2.2 | 2.9 | 6.38 | 300 |
| Example 16 | 2.9 | 2.9 | 6.28 | 850 |
| Example 17 | 1.9 | 2.6 | 4.94 | 400 |
| Example 18 | 2.3 | 2.9 | 6.67 | 900 |
| Example 19 | 2.1 | 2.9 | 6.09 | 500 |
| Example 20 | 1.3 | 2.7 | 3.51 | 1000 |

TABLE 4

| | Discharge capacity (Ah) | Average voltage (V) | Energy (Wh) | Cycle life number at 60° C. |
|---|---|---|---|---|
| Comparative Example 1 | 1.0 | 2.4 | 2.4 | 0 |
| Comparative Example 2 | 0.8 | 1.8 | 1.44 | 0 |
| Comparative Example 3 | 1.2 | 2.0 | 2.2 | 100 |
| Comparative Example 4 | 1.0 | 3.3 | 3.2 | 150 |
| Comparative Example 5 | 1.2 | 2.4 | 2.88 | 10 |
| Comparative Example 6 | 0.5 | 2.5 | 1.25 | 50 |
| Comparative Example 7 | 1.0 | 2.6 | 2.6 | 200 |
| Comparative Example 8 | 1.0 | 3.2 | 3.2 | 100 |
| Comparative Example 9 | 1.0 | 2.5 | 2.5 | 200 |
| Comparative Example 10 | 1.5 | 2.0 | 3.0 | 0 |

As is clear from Tables 1 to 4, the secondary batteries of Examples 1 to 20 have more excellent discharge capacity, energy, and high temperature cycle life performance than those of Comparative Examples 1 to 10.

The secondary batteries of Comparative Examples 1 to 3 and 9 include an aqueous metal chloride solution as a cathode and correspond to the secondary battery described in Yoshinori Morita et al., High Specific Energy Density Aqueous Lithium-Metal Chloride Rechargeable Batteries, Journal of The Electrochemical Society, 164 (9) A1958-A1964 (2017). Since the secondary batteries of Comparative Examples 1 and 2 could not be charged, the charge and discharge cycle test could not be performed. Therefore, the cycle life at 60° C. was zero. The secondary batteries of Comparative Examples 3 and 9 could be charged, but hydrogen was generated during discharge.

According to the comparison of Comparative Examples 4 and 5, when the metal halide was used in place of the lithium metal oxide as the positive electrode active material in the secondary battery including the porous separator and the organic electrolytic solution, the cycle life at 60° C. was further shortened. This is because the metal ions of the metal halide dissolve, pass through the porous separator, and is deposited on the surface of the negative electrode, resulting in a rapid decrease in capacity and an increase in resistance.

From the results of Comparative Example 6, it can be seen that, when the metal halide is used as the positive electrode active material, and the organic electrolytic solution is used, the discharge capacity and the cycle life at 60° C. are significantly reduced.

From the results of Comparative Example 7, it can be seen that, when the nonaqueous electrolyte for the positive electrode does not include the chlorine ions, the discharge capacity and the cycle life at 60° C. are significantly reduced.

From the results of Comparative Example 8, it can be seen that, when the ionic liquid is used as the electrolytic solution in the secondary battery in which the lithium metal oxide is used as the positive electrode active material and the porous separator is used, the discharge capacity and the cycle life at 60° C. are poor.

Comparative Example 10 corresponds to the lithium battery described in U.S. Pat. No. 5,552,241. In the lithium battery of Comparative Example 10, a discharge reaction occurs due to the reduction reaction of S. In the battery, the discharge product of S included in the positive electrode active material elutes, and reacts with lithium to produce lithium sulfide. The production reaction causes the self-discharge to proceed. The reaction is irreversible, and the produced lithium sulfide increases the battery resistance. As a result, the lithium battery of Comparative Example 10 has a short charge and discharge cycle life.

From the comparison of Examples 1 to 7, it can be seen that, when copper chloride is used as the positive electrode active material, an excellent high temperature cycle life can be obtained.

From the comparison of Examples 1, 8 and 9, it can be seen that an excellent high temperature cycle life can be obtained by using the sulfonium salt as the ionic liquid in contact with the positive electrode.

By comparing Example 1 with Example 11, it can be seen that the discharge capacity and energy of the secondary battery of Example 1 using the Li metal for the negative electrode are more excellent than those of the secondary battery of Example 11 using the Li alloy for the negative electrode. By comparing Example 3 with Example 20, it can be seen that the discharge capacity and energy of the secondary battery of Example 3 using the Li metal for the negative electrode are more excellent than those of the secondary battery of Example 20 using the carbon material having lithium ions inserted and extracted for the negative electrode. From these results, it can be seen that the Li metal is desirably used for the negative electrode in order to obtain high discharge capacity and energy.

By comparing Examples 1, 12 and 13, it can be seen that the discharge capacity, energy, and high temperature cycle life performance of the secondary battery of Example 1 using LiTFSI as the lithium salt to be mixed with the ionic liquid in contact with the positive electrode are more excellent than those in Examples 12 and 13. Therefore, the lithium salt is desirably one or two or more of LiTFSI, LiFSI, or LiFTFSI.

From the results of Examples 2 and 19, it can be seen that Example 2 using the NASICON type solid electrolyte as the lithium-ion conductive solid electrolyte is advantageous for the high temperature charge and discharge cycle performance, and Example 19 using the garnet type solid electrolyte is advantageous for the discharge capacity and the energy.

The secondary battery of at least one embodiment or Example described above includes the positive electrode including the halide including at least one metal element selected from the group consisting of copper, iron, nickel, cobalt, tin, and zinc, as the positive electrode active material, and the nonaqueous electrolyte including chlorine ions, whereby the energy density and the cycle life performance can be improved. The secondary battery further has excellent over-charge performance and over-discharge performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
   a positive electrode including a halide, the halide including at least one metal element selected from the group consisting of copper, iron, nickel, cobalt, tin, and zinc, as a positive electrode active material;
   a negative electrode including at least one selected from the group consisting of lithium metal, a lithium alloy, and a compound capable of having Li inserted and extracted, as a negative electrode active material;
   a first nonaqueous electrolyte formed of an ionic liquid including chlorine ions comprising a non-chloroaluminate-based ionic liquid and the first nonaqueous electrolyte being in contact with the positive electrode;
   a second nonaqueous electrolyte including lithium ions that is different from the ionic liquid including chlorine ions, and is in contact with the negative electrode; and
   a separator having lithium ion conductivity and being interposed between the positive electrode and the negative electrode, and
   wherein the separator having lithium ion conductivity allows only lithium ions to permeate.

2. The secondary battery according to claim 1, wherein the separator having lithium ion conductivity comprises a lithium-ion conductive solid electrolyte.

3. The secondary battery according to claim 1, wherein a halogen ion of the halide is at least one ion selected from the group consisting of a fluorine ion and a chlorine ion.

4. A battery pack comprising the secondary battery according to claim 1.

5. The battery pack according to claim 4, further comprising:
   an external power distribution terminal; and
   a protective circuit.

6. The battery pack according to claim 4, comprising plural of the secondary battery, the secondary batteries being electrically connected in series, in parallel, or in a combination of in-series and in-parallel.

7. A vehicle comprising the secondary battery according to claim 1.

8. A stationary power supply comprising the secondary battery according to claim 1.

9. The secondary battery according to claim 1, wherein the first nonaqueous electrolyte and the second nonaqueous electrolyte do not mix with each other.

10. The secondary battery according to claim 1, wherein the first nonaqueous electrolyte and the second nonaqueous electrolyte exist independently of each other.

* * * * *